United States Patent
Brown

[15] 3,677,675
[45] July 18, 1972

[54] PLASTICS THERMOFORMING MACHINE
[72] Inventor: Gaylord W. Brown, Beaverton, Mich.
[73] Assignee: Koehring Company, Milwaukee, Wis.
[22] Filed: Jan. 27, 1970
[21] Appl. No.: 6,067

[52] U.S. Cl. ............................425/107, 18/16 T, 425/397, 425/398, 425/171, 425/193
[51] Int. Cl. ..................................................B29c 17/04
[58] Field of Search ....................18/4 R, 4 P, 4 B, 5 A, 19 R, 18/19 F, 19 N, 16 R, 16 T; 226/179, 173; 34/239; 165/69; 264/165; 263/3

[56] References Cited

UNITED STATES PATENTS

| | | | |
|---|---|---|---|
| 3,193,881 | 7/1965 | Kostuv | 18/19 F |
| 3,496,257 | 2/1970 | Brown et al. | 18/19 F X |
| 2,365,322 | 12/1944 | Ashworth | 226/179 |
| 2,979,829 | 4/1961 | Uhleen | 226/179 UX |
| 743,972 | 11/1903 | Belle | 18/4 R |
| 3,273,203 | 9/1966 | Ross | 18/19 F |
| 3,540,081 | 11/1970 | Carrieri et al. | 18/16 R X |

Primary Examiner—Robert L. Spicer, Jr.
Attorney—Learman and McCulloch

[57] ABSTRACT

A synthetic plastics thermoforming machine including relatively axially separable and closeable mold mechanism with platens and molds releasably supported thereon and advancing sheet assemblies for supporting a plastic sheet to be formed in position to be molded upon closing movement of the mold mechanism. A fluid pressure operated ram for moving one of the molds toward the other is mounted on a frame member which is movable relative to the platen and mold. Half bearing members carried by the platen and supporting it for movement on frame structure guide rods is also included and mechanism is provided for moving the bearing members outwardly from the platen. A plastic sheet preheating oven is incorporated and is movable to a position in which operating shocks are prevented from being transferred to it.

28 Claims, 17 Drawing Figures

INVENTOR
GAYLORD W. BROWN
BY Learman & McCulloch
ATTORNEYS

Patented July 18, 1972

INVENTOR.
GAYLORD W. BROWN

BY Learman & McCulloch
ATTORNEYS

Patented July 18, 1972 3,677,675

INVENTOR.
GAYLORD W. BROWN
BY *Learman & McCulloch*
ATTORNEYS

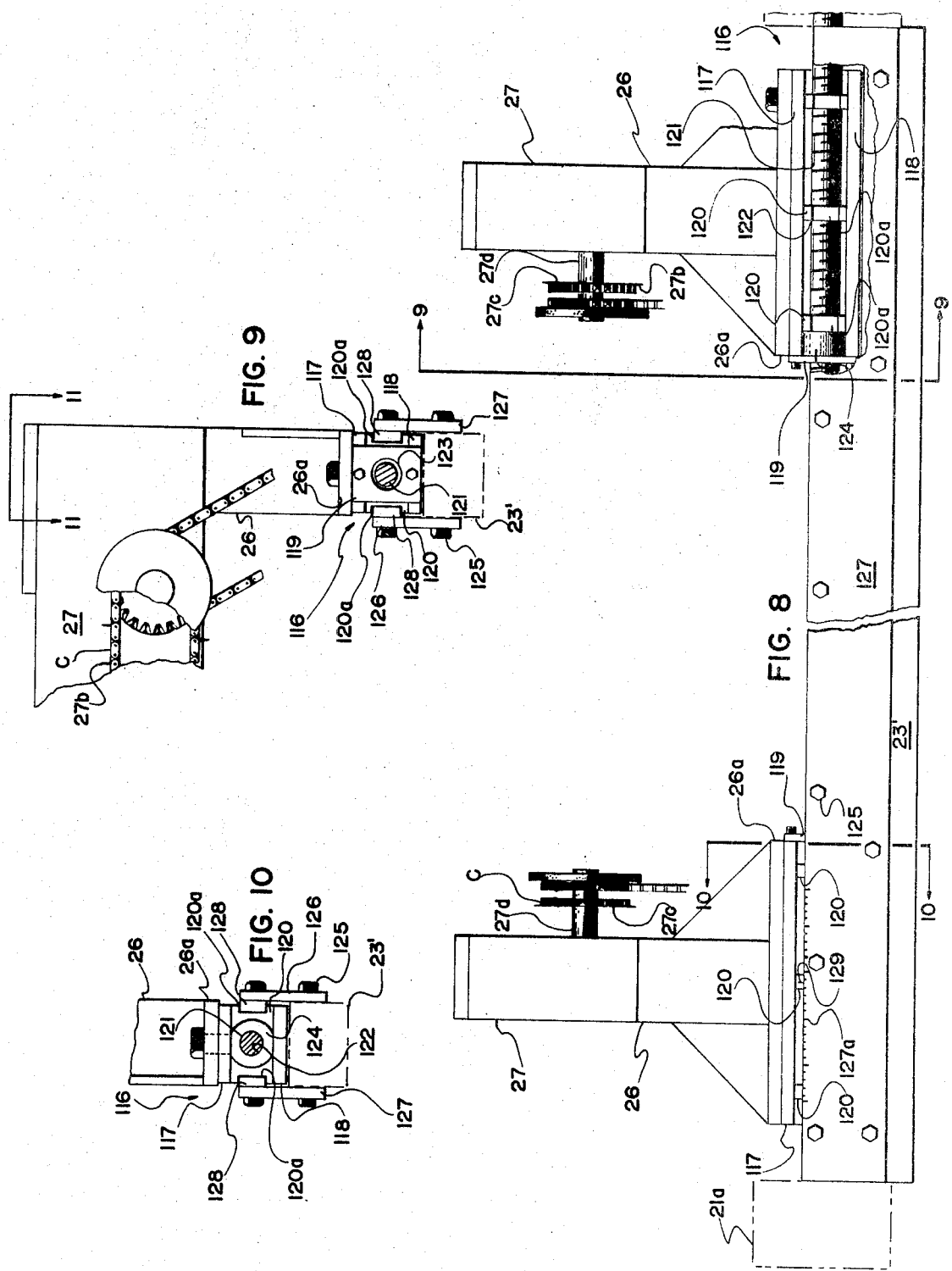

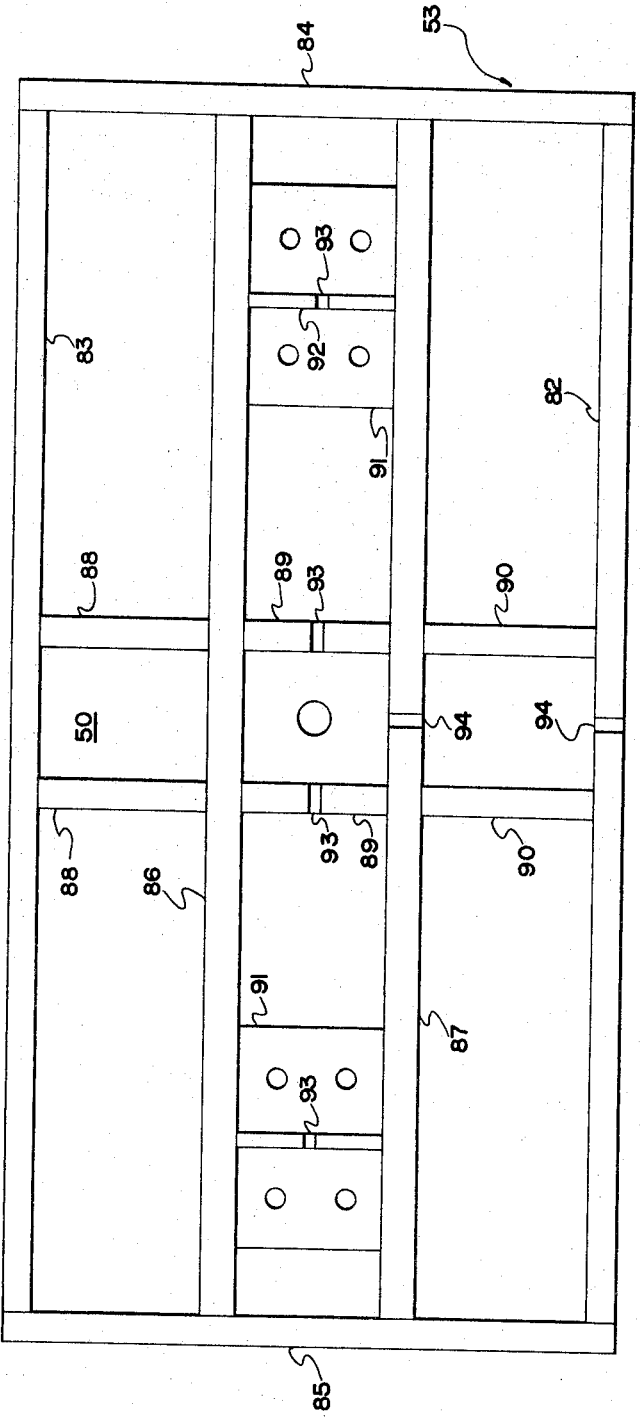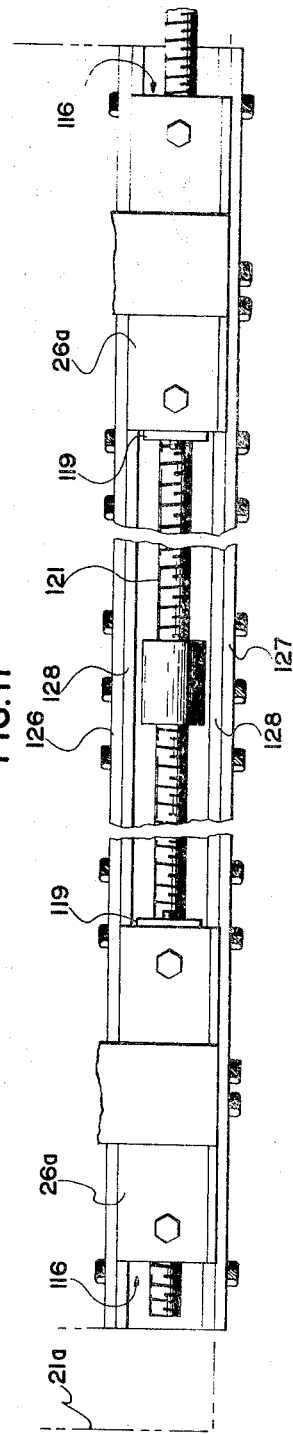

INVENTOR.
GAYLORD W. BROWN

BY Learman & McCulloch
ATTORNEYS

Patented July 18, 1972

INVENTOR.
GAYLORD W. BROWN

BY
*Learman & McCulloch*
ATTORNEYS 3,677,675

PLASTICS THERMOFORMING MACHINE

The present invention relates to thermoforming machinery and more particularly to differential pressure machines of this type in which a heated plastic sheet is disposed between closeable molds and is formed by the molds.

One of the prime objects of the present invention is to design machinery of this character which is adaptable to process different widths of plastic sheet or web material in a simple and economically practical manner.

A further object of the invention is to provide machinery of this character which provides for the automatic location of the mold relative to the supporting platen.

Still another object of the invention is to provide thermoforming machinery of the character described which permits the molds to be precisely relatively positioned such that upon closing movement thereof, a proper closing pressure is obtained and a proper mold seal is achieved.

Still another object of the invention is to provide machinery of this character within the platen bearings may be properly positioned with regard to the differential thermal expansion effect experienced and will accordingly operate reliably without undue wear, and without requiring undue quantities of lubricant.

Still a further object of the invention is to provide a thermoforming machine which does not transmit operating shocks or vibrations to the oven structure for preheating the synthetic plastic sheet to forming temperatures.

Other objects and advantages of the invention will become apparent upon reference to the specification and to the accompanying drawings wherein:

IN THE DRAWINGS

FIG. 8 is a front elevational view of the sheet advancing chain rail mounting assembly only with portions partly broken away to illustrate the manner in which the chain rails may be moved in unison to various positions;

FIG. 9 is a transverse sectional elevational view taken on the line 9—9 of FIG. 8;

FIG. 10 is a fragmentary transverse sectional elevational view taken on the line 10—10 of FIG. 8;

FIG. 11 is a fragmentary, sectional top plan view taken on the line 11—11 of FIG. 9;

FIG. 12 is a fragmentary inverse sectional plan view taken on the line 12—12 of FIG. 2 and showing the upper platen only;

GENERAL DESCRIPTION

Figure 1:
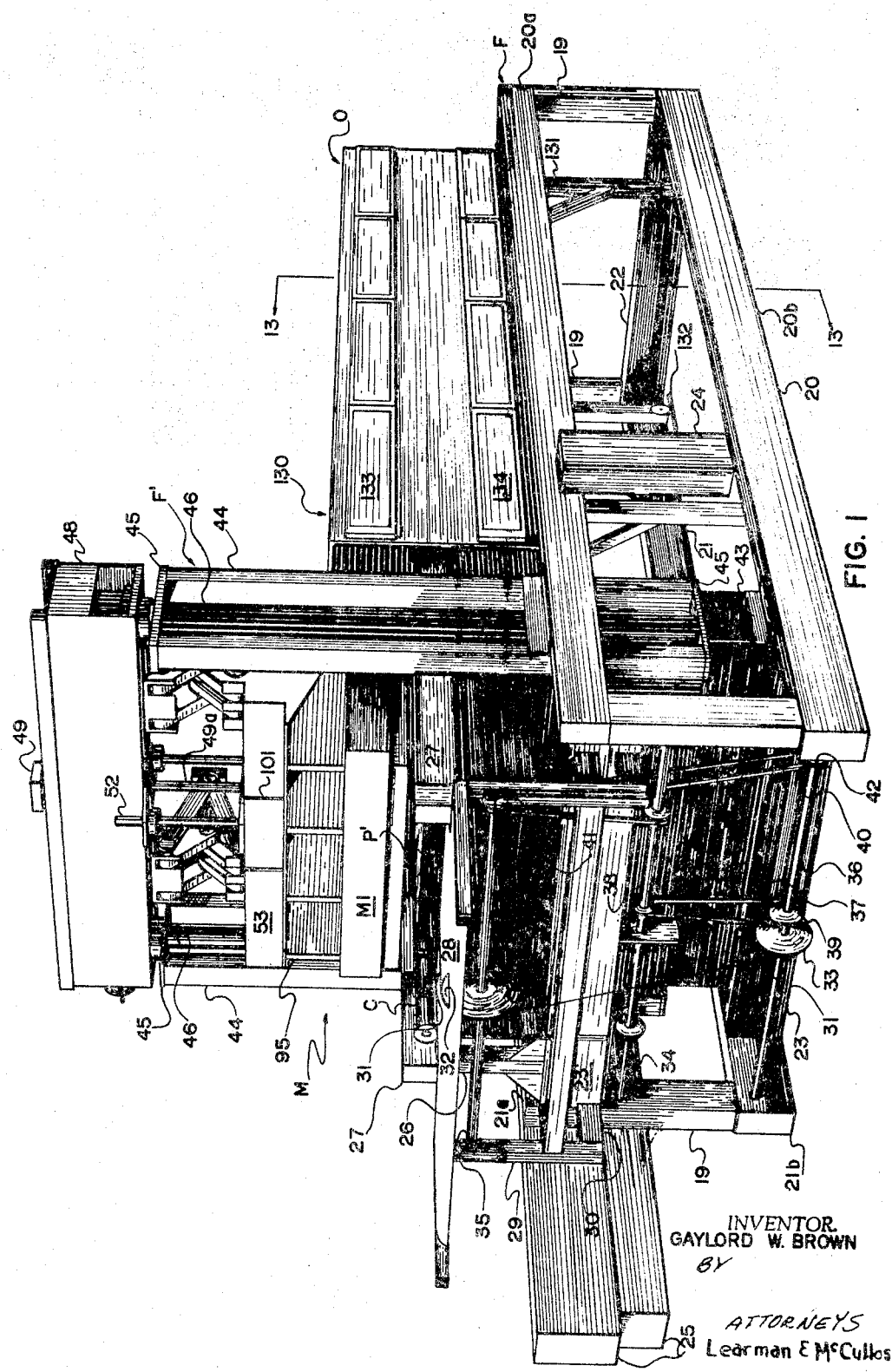
FIG. 1 is a perspective, front and side elevational view of the improved thermoforming machine.

Referring now more particularly O, the accompanying drawings, and in the first instance to FIG. 1, a thermoforming machine of the general type shown in the present assignee's U.S. Pat. No. 3,346,923, and incorporated herein by reference, is shown and comprises a frame structure generally designated F with a "free standing" oven generally designated 0 to later be described in detail, extending longitudinally from the input end of the machine.

As is usual, a synthetic plastic web P (see FIG. 2), such as polyethylene, polystyrene, or another commercial variety, is fed through the oven 0 to a molding station generally designated M by web advancing chains C which may be of the character described in the U.S. Pat. No. 3,216,491, also incorporated herein by reference, and also owned by the assignee of the present invention. The chains in the present machine may be considered to be powered in the same manner to advance the web P in increments with a period of dwell therebetween in the usual manner.

The frame F includes side frames 20 and 21 connected by spanning end support members 22 at the input side of the machine and 23 and 23' at the discharge end of the machine. The side frames 20 and 21 include upper and lower rail members 20a and 20b, and 21a and 21b respectively which are connected by vertical members 19. An electrical control box 24 is shown as supported by the one side frame 20 and, at the opposite side of the machine, the side frame 21 supports advancing chain powering mechanism within a housing 25. The upper end support member 23' supports vertical brace members 26 which carry the advancing chain rails 27 in a manner such that the members 27 may be simultaneously moved relatively toward one another or spread apart. The mechanism for accomplishing this will be later described.

Also at the exit end of the machine, a discharge shelf 28, for receiving the plastic web P as it moves from the mold assembly M, is supported by post 29 and braces 30 from the upper cross support 23'. An endless sag band 31 trained around pulleys 32 and 33 and extending the length of the machine, is driven in coordination with the advancing chains C to support the medial portion of the web P and assist them in moving the plastic web P through the machine in increments of travel.

It is to be understood that the advancing chain assembly may be driven in the manner described in the present assignees U.S. Pat. No. 3,217,852, also incorporated herein by reference, if desired. The advancing chain rail assembly will later be described in more detail.

The shaft 34 may be considered to be the drive shaft which drives both the upper and lower shafts 35 and 36 on which pulleys 32 and 33 are respectively fixed, shaft 36 being driven via a drive chain 37 trained around pulleys 38 and 39 on the shafts 34 and 36 respectively and shaft 35 being driven via a drive belt 40 trained around pulleys 41 and 42 on the shafts 35 and 36 respectively. The shaft 34 is also connected to drive the plastic web advancing chains C in any suitable manner.

Figure 2:
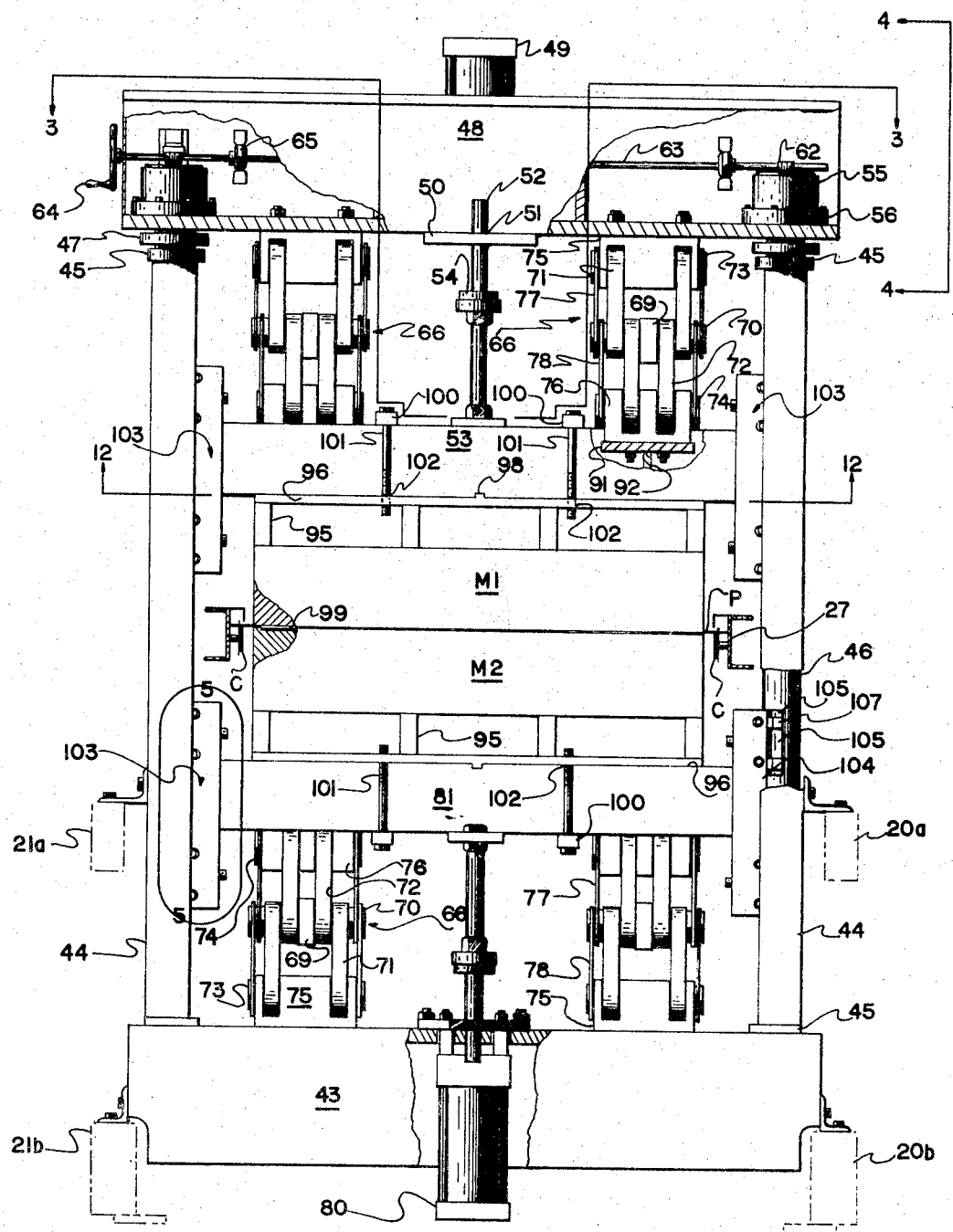
FIG. 2 is a fragmentary front elevational view of the mold assembly only, with the molds illustrated in closed position and portions broken away to more clearly illustrate certain mechanisms.
Figure 4:
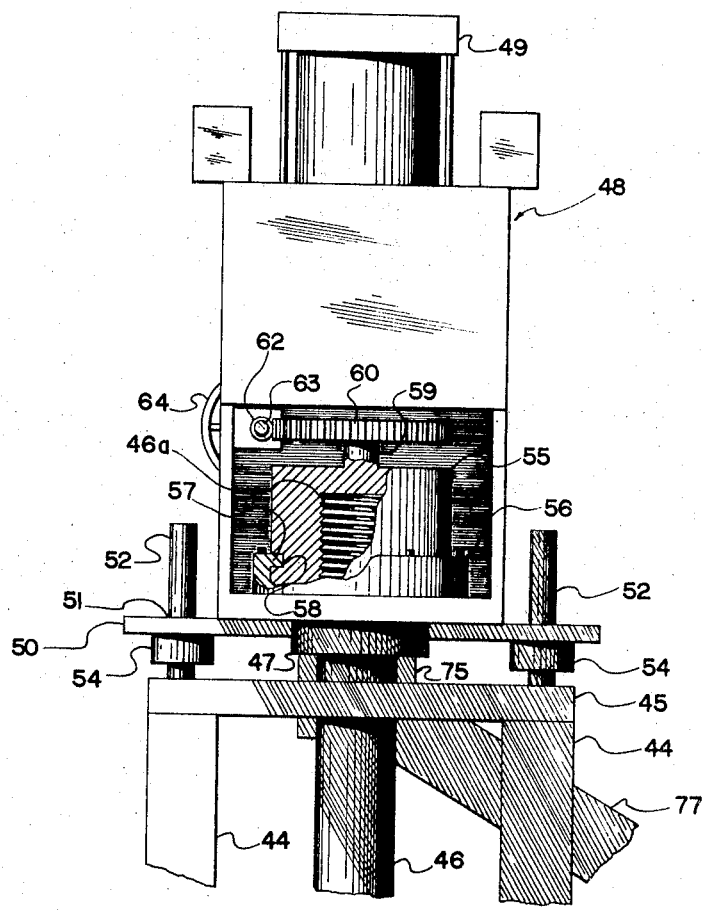
FIG. 4 is an enlarged, partly sectional, fragmentary side elevational view taken on the line 4—4 of FIG. 2.
Figure 5:
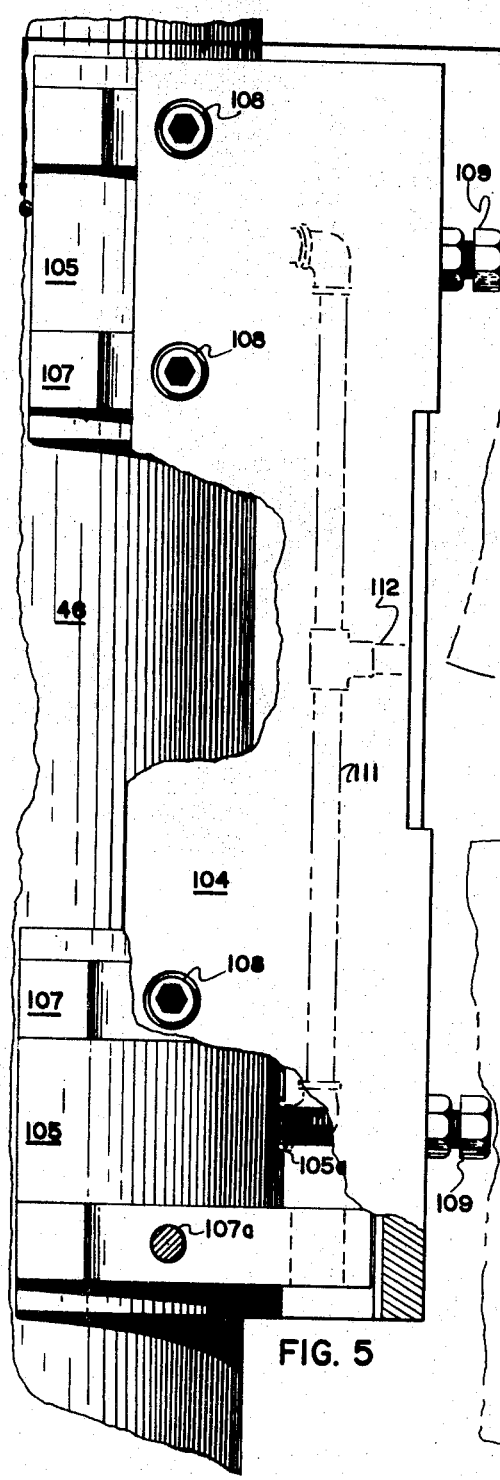
FIG. 5 is an enlarged fragmentary elevational view of only the elements encircled at 5—5 in FIG. 2, portions being broken away to illustrate parts thereof.

The mold and platen assemblies (see FIGS. 1 and 2 particularly) includes its own vertically extending subframe, generally designated F', which is fixed to the main frame F in any suitable manner, and includes a lower sill member 43 fixed to the main frame F and having upwardly extending pairs of vertical post members 44 fixed thereto and connected at their upper ends by upper and lower bar members 45. As FIGS. 1 and 2 indicate, the frame members F' also include vertically extending guide posts 46 which have threaded upper ends 46a as shown particularly in FIG. 4. The posts 46 are shouldered as at 47 and the shoulders 47 function as lower stops for an upper sill member assembly generally designated 48 which carries the double acting, upper mold actuating, fluid pressure operated cylinder 49. The upper sill member 48 may be raised and lowered relative to the fixed sill 43 in a manner in which will be described and includes a plate 50 having openings 51 to freely receive the guide posts 52 which project upwardly from an upper platen member 53 (FIG. 2). Stop collars 54 fixed on the posts 52 limit the upward travel of the platen 53 relative to the upper sill member 48.

The upper sill member 48 may be moved upwardly or downwardly relative to the lower sill member 43 for a purpose which will later become apparent. Mounted on the threaded upper portions 46a of the guide posts 46 are nut members 55 which are connected with the upper sill member 48 via collars 56 fixed to the sill member 48, the collars 56 having inwardly projecting keys 57 received in an annular groove or keyway 58 provided in each nut member 55. Thus, the nut members 55 are restrained from moving axially relative to sill members 48 but plainly can rotate with respect to them. At the upper end of nut members 55 are shafts 59 on which worm wheels 60 are fixed in mesh with worms 62 on a shaft 63 having an externally projecting manually operable hand wheel 64. Bearings 65 mounted on the sill housing 48 support the shaft 63 for rotation. The piston rod 49a of cylinder 49, of course, connects to the upper platen 53 in the usual manner and, also provided, are toggle link locking assemblies generally designated 66 of the character disclosed in the aforementioned U.S. Pat. No. 3,346,923. Each toggle link assembly 66 includes a double acting, fluid pressure operated, actuating cylinder 67 having its piston rod 68 connected to a center block 69 mounted on the central pivot pin 70 of each toggle link assembly 66. Upper and lower pairs of toggle links 71 and 72, respectively, also mounted on each pin 70, pivotally connect at their ends with an upper pin 73 and a lower pin 74 carried respectively by an upper mount block 75, and a lower mount block 76 connected to the platen 53. Pairs of upper and lower links 77 and 78 also mounted by each pin 70 extend rearwardly to pivotally connect with each pin 79 on each actuating cylinder 67. The toggle link assembly 66 operate, as in U.S. Pat. No. 3,346,923, to hold the upper platen 53 in lowered position and preload the upper platen 53 in a downward direction.

The lower sill member 43 mounts a double acting, fluid pressure operated cylinder 80 having a piston rod 80a which connects to the lower platen 81. Similar toggle link assemblies 66 connect the lower sill member 43 and lower platen 81 and, for purposes of convenience, the same numbers have been used to designate the respective parts thereof and the assemblies will not further be described.

Both the upper and lower molds M1 and M2, respectively, connect to their respective upper and lower platens 53 and 81, respectively, in the same manner and accordingly it will be necessary only to describe the manner in which one is mounted. Hence, like numerals have also been used for identical parts in connection with the mounting of both the upper and lower molds M1 and M2.

As FIGS. 2 and 12 indicate, both the platens 53 and 81 comprise an open frame with side members 82 and 83 connected by end members 84 and 85. Also provided are intermediate members 86 and 87 which span the end members 84 and 85, the members 86 and 87 being braced by pairs of cross pieces 88, 89 and 90. Spanning the members 86 and 87 are support plates 91 for the toggle link assemblies 66 which include vertically extending webs 92. It should be observed that aligned grooves or keyways 93 are provided in the webs 92 and members 89, and aligned crosswise keyways 94 are provided in the members 82 and 87. The purpose in providing these keyways will presently become apparent.

Figure 3:
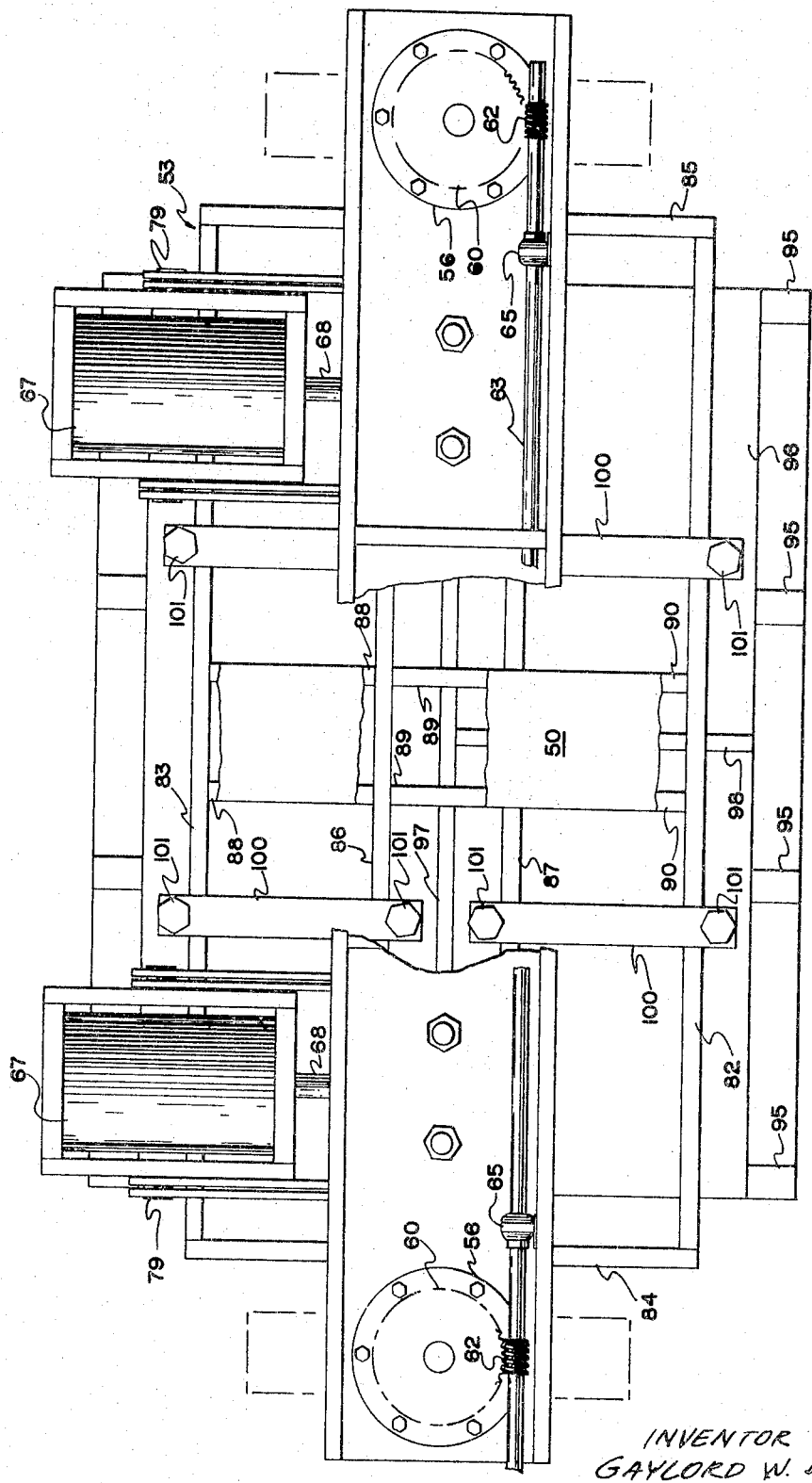
FIG. 3 is an enlarged, sectional plan view taken on the line 3—3 of FIG. 2.

Each mold M1 and M2 has vertically extending standoff bars 95 for supporting a keyplate 96 which, as FIG. 3 clearly shows, includes a key 97 adapted to be received within keyways 93 and a cross key 98 adapted to be received in keyways 94. As FIG. 2 indicates, a cavity enclosing, perimetral, deformable rubber seal 99 is carried by the lower mold M2 which may be the male mold member and it is to be understood that, in the manner indicated in the aforementioned U.S. Pat. No. 3,346,923, air under pressure is supplied to the male mold M2 and the female mold M1 is connected with a source of suction. Provided to secure the molds M1 and M2 to the platens 53 and 81 respectively are hanger members, each comprising a platen spanning bar 100 with dependent hanger bolts 101 which are received in threaded openings 102 provided in the keyway plate 96 (see FIG. 2).

Figure 6:
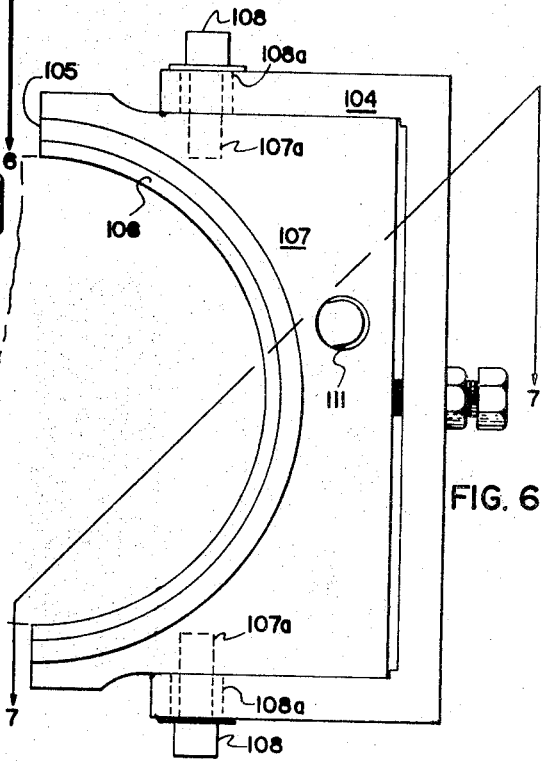
FIG. 6 is a top plan view taken on the line 6—6 of FIG. 5.
Figure 7:
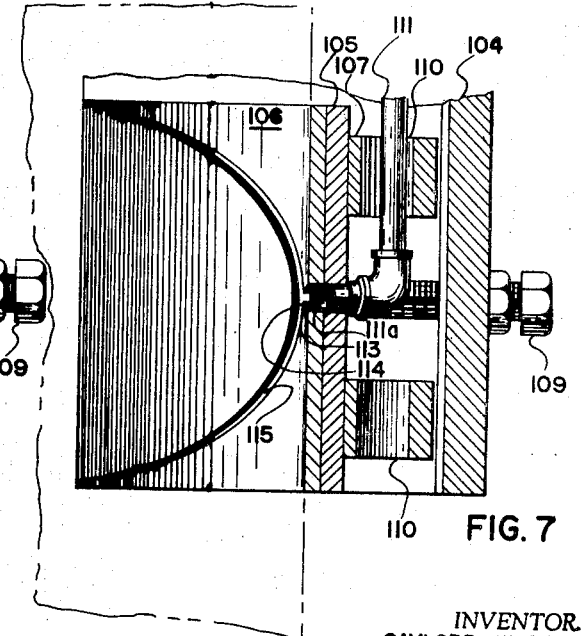
FIG. 7 is a vertical sectional taken on the line 7—7 of FIG. 6.
Figure 13:
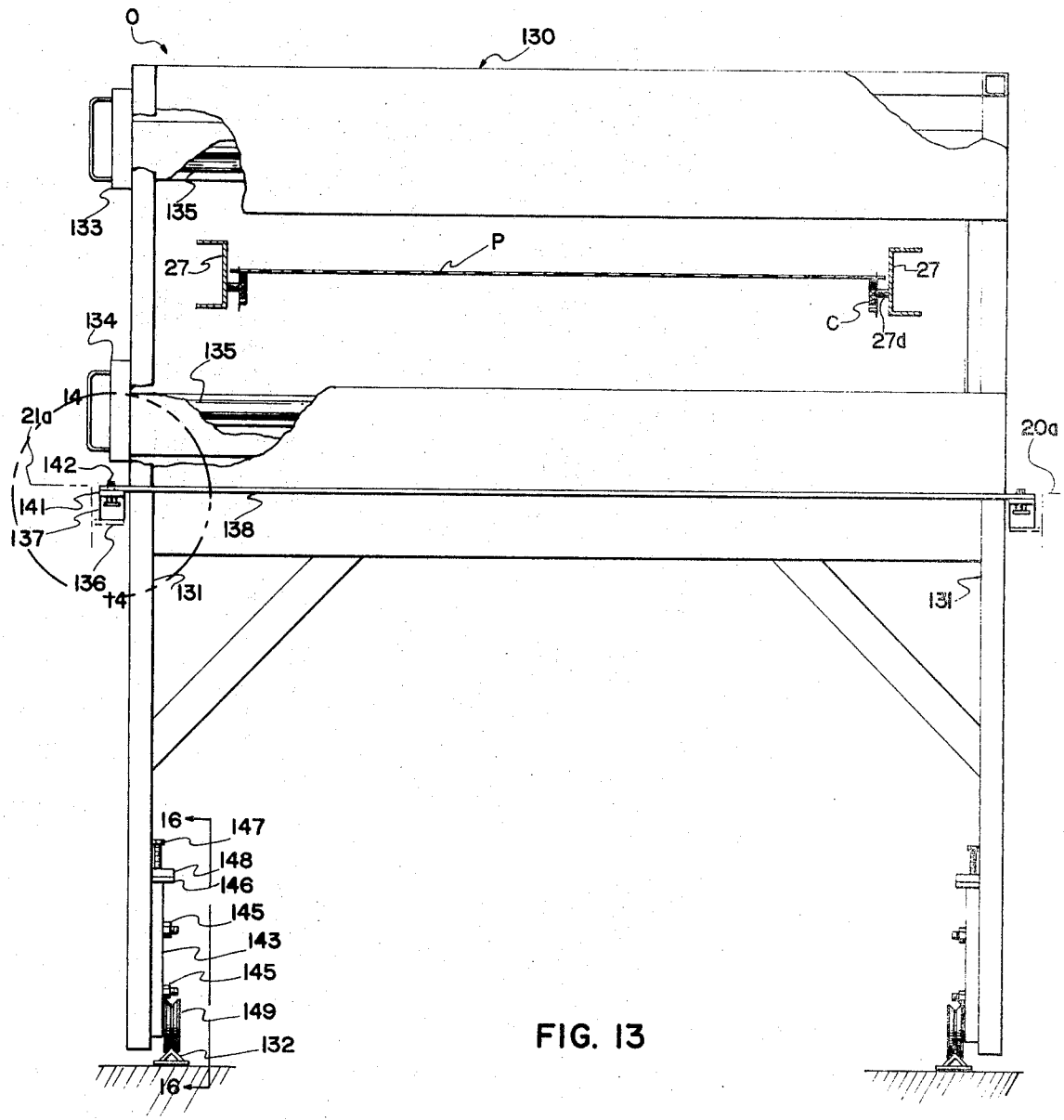
FIG. 13 is an enlarged end elevational view of the oven assembly only taken on the line 13—13 of FIG. 1 and omitting other elements of the forming machine in the interest of clarity.

As FIG. 2 particularly indicates, slide bearing assemblies generally designated 103 are fixed to each end of the upper and lower platens 53 and 81. The bearing assemblies 103, which guide on the guide posts or rods 46, each include a housing 104 for a pair of vertically spaced semi-cylindrical socket members 105 which mount brass bushings 106. Backup members 107 (FIG. 6) fixed to the socket members 105 may be adjustably bolted to the housing 104 as at 108. Adjusting bolts 109 mounted on the housings 104 extend between the members 107 into engagement with flatted portions 105a on the semicylindrical socket members 105 and, at a time when bolts 108 are backed off, permit the radial movement of socket members 105 relative to the housings 104. The replaceable bolts 108, it will be noted, extend through enlarged openings 108a in the housing member 104 into threaded bores 107a in members 107. Also provided in the members 107 are openings 110 for passing a lubrication pipe 111 for each assembly 103 which is connected via a pipe 112 with a suitable source of light machine oil or other lubricant. The line 112 connects with a suitable source of oil under pressure which is forced through the pipe 111 and jetted out nozzles 111a which discharges through openings 113 and 114 in the members 105 and 106, respectively, to lubricate grooves 115 extending as indicated in the brass bushings 106.

THE CHAIN RAIL ASSEMBLY

The mechanism for spreading and closing the plastic web advancing assemblies 27, which is shown particularly in FIGS. 1 and 8 – 11, will now be described. The vertical supports 26, which carry the assemblies 27, each include lower plate members 26a, to which are connected enclosed housings generally designated 116. The housings 116 comprise upper and lower sill members 117 and 118 (FIG. 10) connected by an end plate 119, and intermediate connecting members 120 as shown. The housings 116 mount a threaded shaft 121 which extends through openings 122 provided in each of the members 120. The shaft 121 also passes through an enlarged opening 123 provided in the end plate 119 of each housing 116.

Trapped between the end plate 119 and the innermost member 120 of each housing 116 is a nut 124 which is in threaded engagement with the shaft 121. Rotary movement of the shaft 121, which has a polygonal end which may be gripped by a suitable socket wrench or the like, causes the housings 116 to move axially relative to the shaft 121. It is to be understood, that the assembly shown at the right end of FIG. 8 is duplicated at the left end except that the threads 121 are of an opposite pitch or hand. Thus, when the shaft 121 is rotated, the pair of housings 116 and the members 26 which are fixed thereon will ether move outwardly away from one another or inwardly toward one another dependent on the direction of rotation. The indexing web advancing endless chains C with the web piercing pins 27b, which are trained around sprockets 27c on shafts 27d, move with the rails 27. Bolted to the support 23' as at 125, are straps 126 and 127 mounting stationary bushings 128 as shown, which are received by guide notches 120a in the members 120 and guide the housing assemblies 116 in their back and forth movement. Suitable graduations 127a may be provided on the member 127 and an indicator mark 129 on the left hand housing 116 as shown so that the operator can gauge the relative positions of these members. It is to be understood that the chain rail assemblies 27 are identically supported at their opposite ends at the input end of the machine for relative closing and spreading movement in unison. The shafts 121 at both ends of the machine are independently rotated in unison to effect this movement which permits various widths of plastic P to be processed. Alternatively, the shafts 121 could be connected with suitable linkage for rotation in unison and driven by a suitable motor.

THE OVEN ASSEMBLY

FIGS. 1 and 13 – 17 well illustrate an improved oven construction which includes a housing generally designated 130 supported at its four corners by leg members 131 on tracks 132 which are fixed to the floor of the building in which the machine is housed rather than to the main frame F or subframe F'. As usual, the oven 0 includes upper and lower removable heater drawers 133 and 134, in which heater elements 135 are mounted, above and below the path of the plastic sheet P, respectively. Mounted on the interior side of the upper support rail 20a of each of the side support frames 20 and 21 are horizontally inwardly extending support plates 136 which support fixed mounting channels 137. The oven housing 130 is mounted on a support plate 138 which at its sides has a series of enlarged openings 138a. Bolts 139 mounted by clamp nuts 140 provided in the channel members 137 extend through the openings 138b. The bolts members 139 function to fix plates 141 to the channel members 137. It will be noted that the support pads or plates 141 also mount pins 142 which are received in certain of the enlarged openings 138a.

Figure 16:
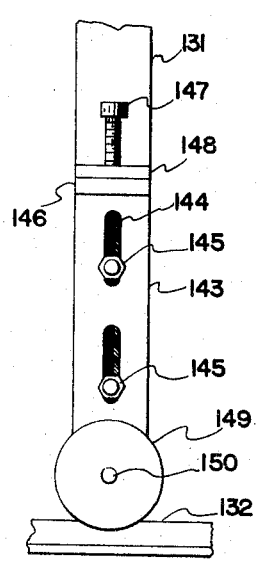
FIG. 16 is an enlarged, fragmentary, interior side elevational view, taken on the line 16—16 of FIG. 13 and showing the manner in which the oven is supported for transport when being shipped.
Figure 17:
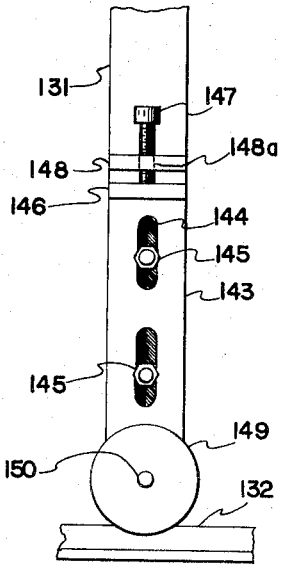
FIG. 17 is a similar view showing the manner in which the "free standing" oven is supported in operative position.
Figure 14:
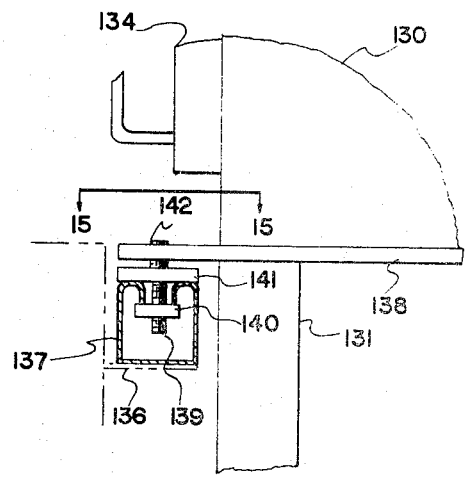
FIG. 14 is an enlarged sectional view of the area encircled in FIG. 13 at 14—14 and illustrating the construction of the oven mount rails.

As FIGS. 16 and 17 indicate, a wheel mounting block 143 is provided at the lower end of each leg 131 and is provided with elongated slots 144, the blocks 143 being bolted to the leg 131 as at 145. At its upper end each member 143 includes a flange 146 which mounts a bolt 147 extending through a threaded opening 148a in a plate 148 fixed to each leg 131. The wheels 149 are mounted on axles 150. When the machine is conditioned for shipment, the blocks 143 are in the position shown in FIG. 16. In this position, the webs 146 and 148 are in engagement. Moreover, the plate 138 rests on the plates 141. When the machine is set up for operation however, the legs 131 are lifted by loosening bolts 145 and manipulating adjusting screws 147 to raise the over housing 130 up off the support pads 141. In this position of the parts, the oven 0 is supported solely by the wheels 149 on tracks 132 and is not in any way supported by or in engagement with the main frame F of the machine. Thus, the oven receives no vibration or shocks incident to operation of the machine. Since the bolts 139 are readily manipulated to unclamp the members 140 and 141 from the channels 137, the oven 0 can be moved forwardly or rearwardly relative to the mold assembly M and then resecured in position.

THE OPERATION

Figure 15:
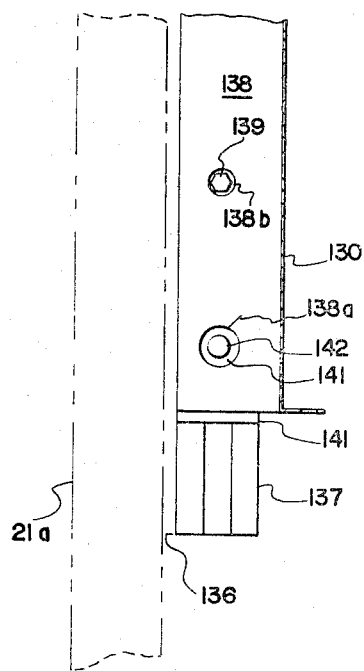
FIG. 15 is a sectional top plan view taken on the line 15—15 of FIG. 14.

When the machine arrives in a plant, the support legs 143 will be in the position shown in FIG. 16 and the plate 138 on oven housing 130 will be supported on the pads 141 which, in this position of the parts, will support the full weight of the oven. To condition the machine for operation, the bolts 139 may be backed off to permit the oven housing 130 to be moved longitudinally relative to the subframe F' and positioned with respect to the molds M1 and M2. The bolts 139 may then be resecured to clamp the rail 137 between the pads 141 and nuts 140. Thereafter, the bolts 145 which secure supports 143 to the legs 131 are backed off and the screws 147 are turned down to jack up the oven housing 0 so that its weight is solely supported by the tracks 132. In this position of the parts, the legs 131 are raised with respect to the wheel supports 143 in the manner illustrated in FIG. 17, and the posts 142 extend freely up through the openings 138a as shown in FIG. 15.

To further condition the machine for operation, the molds M1 and M2 are mounted to the plates 53, the keys 98 engaging in the keyways 94 and the keys 97 engaging in the keyways 93. Thereafter, the hanger bolts 101 are tightened down to secure the molds M1 and M2 to their respective upper and lower platens 53 and 81. It will be noted that the keyways 94 extend only at one side of the platen 53 (see FIG. 12) and that the keys 98 are of compatible length.

Once the molds M1 and M2 are assembled in operative position, the rams or cylinders 49 and 80 are operated to bring the platens M1 and M2 to the closed position shown in FIG. 2. The toggle linkage actuating cylinders 68 are also operated at this time to fully expand the toggle linkage assemblies 66. At this time the sill 48 is in uppermost raised position. To achieve the proper sealing pressure at the rectangular perimetral seal 99 to prevent the loss of any forming air and to seal the mold vacuum, the hand wheel 64 is then turned to rotate shaft 63 in a direction to revolve nuts 55 on the threaded sections 46a of shafts 46 and lower the sill 48 until proper sealing pressures are obtained at the seal 99. For a proper seal, the resilient seal member 99 is deformed somewhat but not sufficiently so that its function is destroyed.

As the machine heats up to operating temperatures, there is differential thermal expansion between the steel guide shafts 46 and the brass bearings 106. After bolts 107a have been backed off, the bolt assemblies 109 are manipulated to move the bearing support blocks 107 in a direction laterally from an outer position toward the posts 46 to achieve proper slide bearing contact.

Finally, the advancing chain assembly chain assembly shafts 121 are simultaneously manipulated to position the chains C to properly receive the edges of the sheet P to be thermoformed and the machine is then conditioned for operation. In preforming the thermoforming operation, the machine operates in the manner of the machines described in the patents mentioned which have been incorporated herein by reference, and no further explanation is considered necessary, inasmuch as the operation of such differential pressure thermoforming machines is well understood by the art.

It is to be understood that the various elements which have been described may be varied and various changes may be made in the various parts to accomplish the same or similar functions without departing from the scope of the invention which is defined in the accompanying claims.

I claim:

1. In an improved synthetic plastics thermoforming machine: a frame structure; relatively axially separable and closeable mold mechanism having at least one mold cavity and including a first mold part mounted for opening and closing axial movement on said frame structure relative to an axially opposite second mold part; means for supporting a plastic sheet to be formed between said mold parts in position to be formed to the shape of said cavity; at least one axially extending fluid pressure operated ram including a cylinder and piston connected between said frame structure and mold mechanism, and operable for effecting said movement; said frame structure incorporating an axially movable sub-frame member; the ram being supported by said member and operably connecting to said first mold part to move said first mold part to and from a closing position in which it substantially engages the plastic sheet; means for rigidly supporting said sub-frame member on said frame structure in a given axial position while permitting it to be moved axially to another such support position; said latter means supporting the sub-frame member for movement in an axial range form a removed position, in which the ram stroke will move the first mold part to said closing position, to a position axially closer to said second mold part; and drive transmission means operably connected with said latter means operable to move said member further axially when the first mold part is in said closing position following operation of said ram to force the first mold part toward the second mold part and adjust the effective axial stroke of said ram.

2. The combination defined in claim 1 in which the means for radially supporting the sub-frame member includes at least one rotatable nut; said frame structure includes an axially extending frame support post at least partly helically threaded to receive said nut; and said drive transmission means includes means for rotating said nut.

3. The combination defined in claim 2 in which said frame member has at least a pair of said nuts and the frame structure has at least a pair of said posts, the posts being spaced apart so that said first mold part is received between them.

4. The combination defined in claim 3 in which said mold mechanism includes a platen for said first mold part incorporating slide bearings receiving said posts.

5. The combination defined in claim 1 in which an axially extending fluid pressure operated cylinder assembly connects between said frame structure and second mold part to move it to and from a closing position in which it substantially engages the opposite side of said plastic sheet.

6. The combination defined in claim 4 in which said mold mechanism includes a platen for said second mold part incorporating slide bearings receiving said posts.

7. In an improved synthetic plastics thermoforming machine: a frame structure; relatively axially separable and closeable mold mechanism having at least one mold cavity and including a first mold part mounted for opening and closing movement on said frame structure; means for supporting a plastic sheet to be formed in position to be formed to the shape of said cavity; at least one fluid pressure operated ram, including a cylinder and piston connected between said frame structure and mold mechanism, operable for effecting said movement; said frame structure incorporating an axially movable sub-frame member and frame guide rods having threaded ends on which said sub-frame member is mounted; said mold mechanism including a platen, mounting said mold, mounted for axial travel on said guide rods; the ram being carried by said sub-frame member and operably connecting to said platen to move said mold part to and from a position in which it lies adjacent the plastic sheet; and nuts on said threaded ends mounting said sub-frame member and mold mechanism for relative movement independently of the operation of said ram; said nuts being rotatable relative to said sub-frame member but prevented from moving axially relative thereto.

8. The combination defined in claim 7 in which gears are connected to rotate said nuts and raise and lower said sub-frame member relative to said platen; and hand wheel mechanism is connected for simultaneously actuating said gears.

9. The combination defined in claim 7 in which guide members on said member and platen maintain axial alignment during movement of said member relative to said platen, and ram operated toggle linkage is connected between said frame structure and mold mechanism.

10. The combination defined in claim 7 in which drive transmission means is operably connected with said nuts for rotating them to move said sub-frame member axially.

11. The combination defined in claim 7 in which said platen incorporates semi-cylindrical slide bearings received on said posts.

12. The combination defined in claim 7 in which crosswisely disposed key and keyway means are provided to mount said mold part on said platen in aligned position; and means is provided for releasably securing said mold part to said platen.

13. In an improved synthetic plastics thermoforming machine: a frame structure; relatively axially separable and closeable mold mechanism having at least one mold cavity and including a first mold part mounted for opening and closing movement on said frame structure; means for supporting a plastic sheet to be formed in position to be formed to the shape of said cavity; at least one fluid pressure operated ram including a cylinder and piston connected between said frame structure and mold and operable for effecting said movement; crosswisely disposed key and keyway means provided to mount said mold part on said platen in aligned position; and means provided for releasably securing said mold part to said platen.

14. The combination defined in claim 13 in which said latter means comprises hanger straps.

15. In an improved synthetic plastics thermoforming machine: a frame structure; relatively axially separable and closable mold mechanism having at least one mold cavity and including a first mold part mounted for opening and closing movement on said frame structure and a platen for said mold part; means for supporting a plastic sheet to be formed in position to be formed to the shape of said cavity; at least one fluid pressure operated ram including a cylinder and piston operably connected between said frame structure and platen for effecting said movement; said frame structure including axially extending platen guide rods; semi-cylindrical slide bearings carried on said platen in bearing engagement with said rods; and means mounting at least one of said bearings for movement outwardly from said platen.

16. The combination defined in claim 11 in which said bearings each include a housing; said bearings being mounted for lateral movement in said housings.

17. The combination defined in claim 16 in which said bearings comprise semi-cylindrical members with back-up holders fixed thereto; and disengageable means is provided for releasably securing said back-up holders to said housings.

18. The combination defined in claim 17 in which positioning screw means on one of said housings is movable into engagement with one of said back-up plates and is actuatable to move a bearing outwardly from said platen when the means releasably securing said back-up holder to the housing is disengaged.

19. The combination defined in claim 17 in which a lubricant supplying tube extends axially through said back-up holders and passages therein and through said bearings connect with the guide rod engaging surfaces of said bearings.

20. In an improved synthetic plastics thermoforming machine: a frame structure; relatively axially separable and closeable mold mechanism having at least one mold cavity and including a first mold part mounted for opening and closing movement on said frame structure and a platen for said mold part; means for supporting a plastic sheet to be formed in position to be formed to the shape of said cavity; at least one fluid pressure operated ram including a cylinder and piston operably connected between said frame structure and platen for effecting said movement; said frame structure including axially extending platen guide rods; semicylindrical slide bearings carried on said platen in bearing engagement with said rods; and means for securing at least one of said bearings in multiple positions laterally outwardly displaced from said platen.

21. In an improved synthetic plastics thermoforming machine: a frame structure; relatively axially separable and closeable mold mechanism having at least one mold cavity and including a mold part mounted for opening and closing movement on said frame structure; spaced apart, longitudinal sheet gripping and advancing member assemblies for supporting opposite edges of a plastic sheet to be thermoformed in position to be molded upon closing movement of said mold mechanism; means operable for effecting separating and closing movement of said mold mechanism; means mounting said sheet advancing member assemblies for relative spreading and closing of said assemblies on said frame structure; and actuating means operable for moving each sheet advancing member assembly simultaneously in opposing directions.

22. The combination defined in claim 21 in which said actuating means comprises a rotatable shaft having threads of opposite hand on opposite ends thereof, and each of said sheet advancing member assemblies includes a support rail having a nut threaded on one end of said shaft and prevented from rotating with said shaft.

23. The combination defined in claim 21 in which scale means and an indicator are provided on said sheet advancing member assemblies and frame structure.

24. In an improved synthetic plastics thermoforming machine: a frame structure; relatively axially separable and closable mold mechanism including axially opposite mold members, at least one of which is mounted for axial movement on said frame structure; means for supporting a plastic sheet to be thermoformed in position between said molds, to be molded upon closing of said mold mechanism; and oven structure leading to said molds and comprising an oven housing with heating elements through which said sheet is moved;

means connecting said oven housing with the frame structure; and means for selectively supporting said oven housing on said frame structure and independently thereof in a manner to preclude operating shocks from being transmitted to said oven housing and heating elements.

25. The combination defined in claim 24 in which support rails are provided on said frame structure and positioning pins are releasably secured thereon and are selectively positionable therealong; said pins extending up through enlarged openings in a plate forming part of said housing; and means is provided for jacking said oven housing up so that it does not rest on said support rails.

26. The combination defined in claim 25 in which said oven housing has support legs, with vertically movable support wheel members thereon, mounted on tracks which do not connect to said frame structure; disengageable means is provided for releasably connecting support wheel members to said legs, and actuating means is provided for moving said wheel members relative to said legs to jack up said oven housing when said disengageable means is disengaged.

27. In an improved synthetic plastics thermoforming machine for forming articles in plastic sheet material: a frame structure; relatively axially separable and closeable mold mechanism including a mold part mounted for opening and closing movement on said frame structure, a sheet edge-gripping and sheet-advancing system comprising transversely spaced apart, longitudinally disposed sheet gripping and advancing member assemblies, for supporting opposite edges of a plastic sheet to be thermoformed in position to be molded, mounted to move the sheet to position to be thermoformed in the mold mechanism, the assemblies comprising longitudinally extending and traveling members having sheet-gripping elements for gripping the sides of the sheet, and supports therefore; means operable for effecting separating and closing movement of said mold mechanism; and means, including transversely extending guide means, mounting said sheet edge-gripping and sheet advancing system for relative transverse spreading and closing movement on said frame structure and holding it in such relative positions.

28. In an improved synthetic plastics thermoforming machine: a frame structure; relatively axially separable and closeable mold mechanism including axially opposite mold members, at least one of which is mounted for axial movement on said frame structure; means for supporting a plastic sheet to be thermoformed in position between said molds, to be molded upon closing of said mold mechanism; and oven structure leading to said molds and comprising an oven housing with heating elements through which said sheet is moved; means connecting said oven housing with the frame structure; and means for supporting said oven housing independently of said frame structure in a manner to preclude operating shocks from being transmitted to said oven housing and heating elements.

* * * * *